May 3, 1927.
C. P. DUBBS
1,627,159
METHOD FOR TREATING PETROLEUM AND OTHER HYDROCARBONS
Original Filed Nov. 30, 1917    5 Sheets-Sheet 1
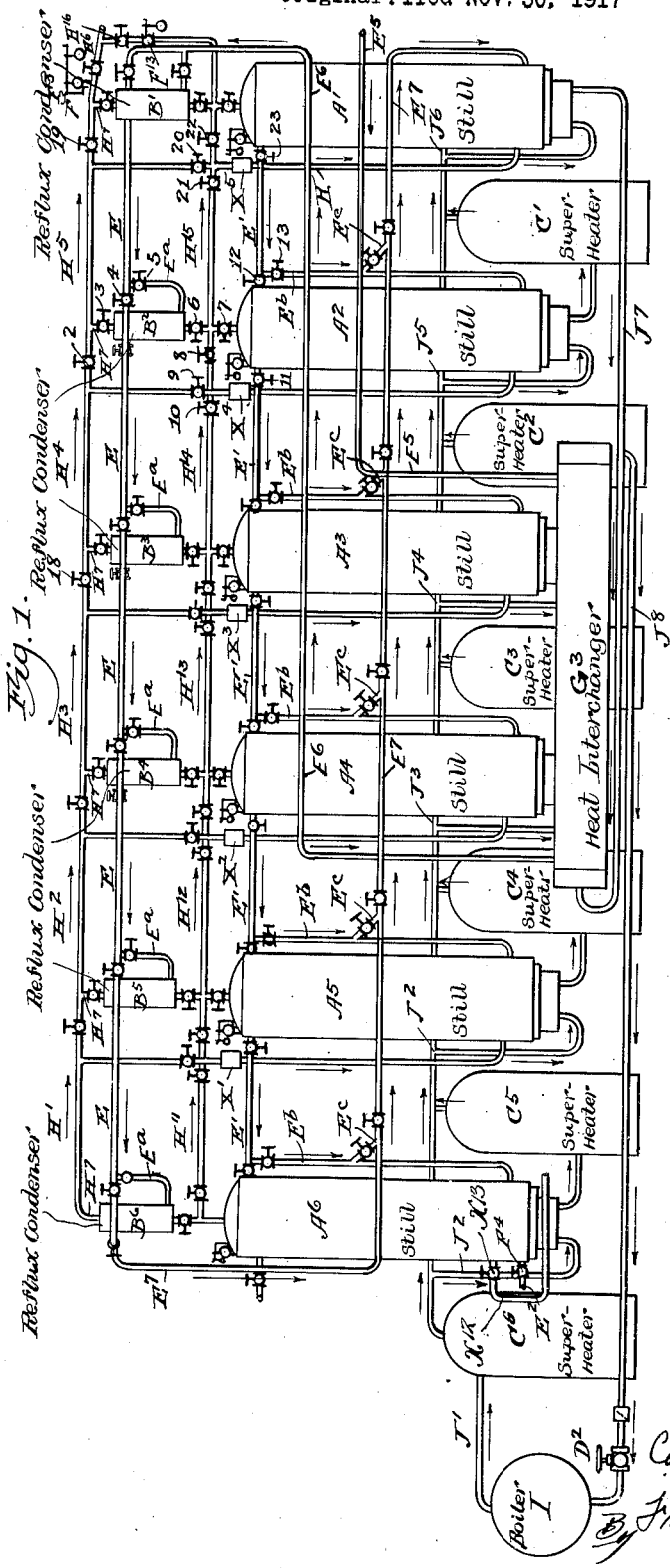
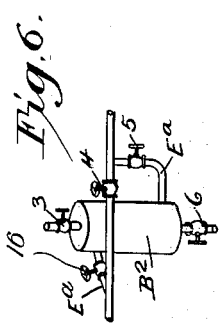

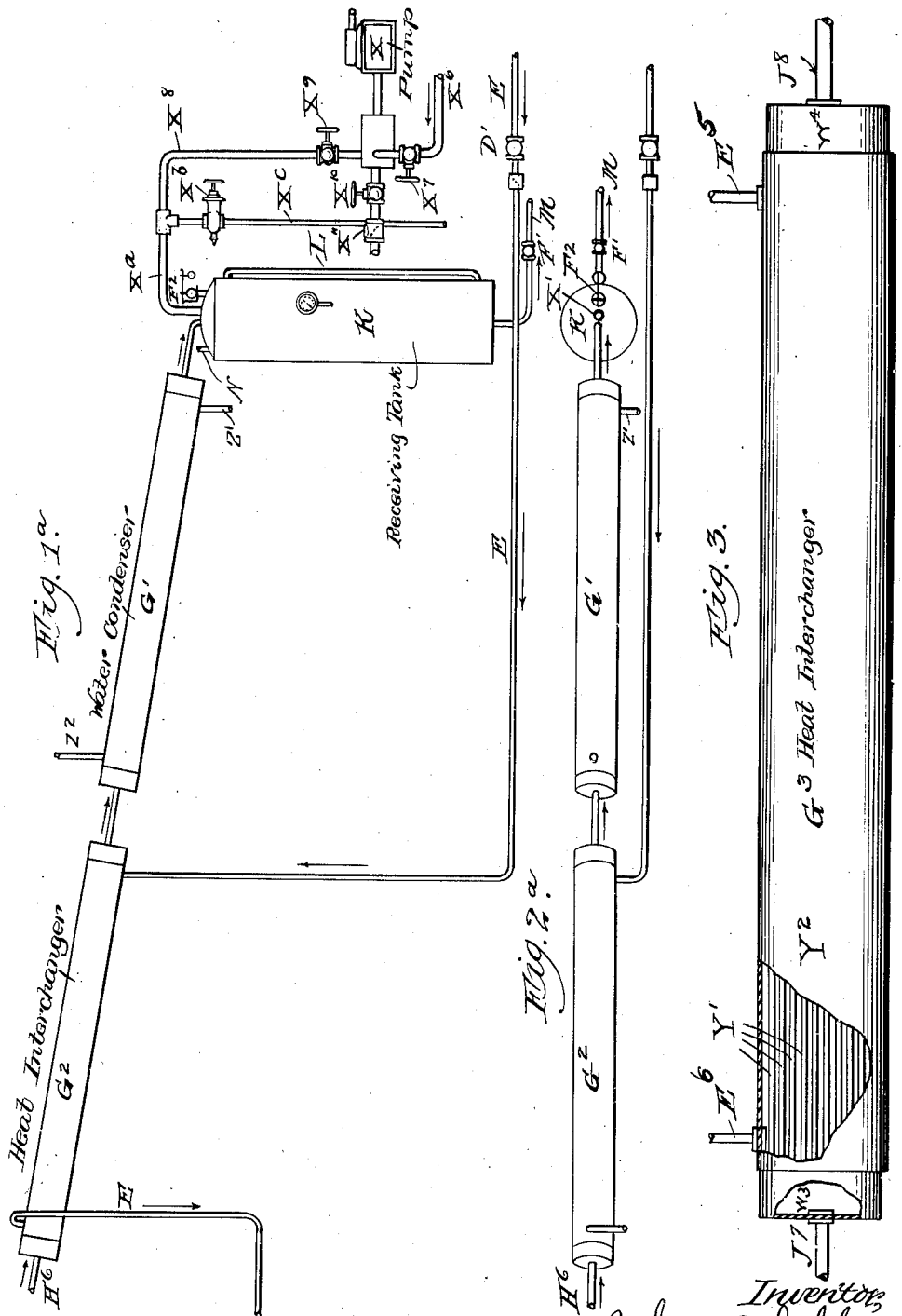

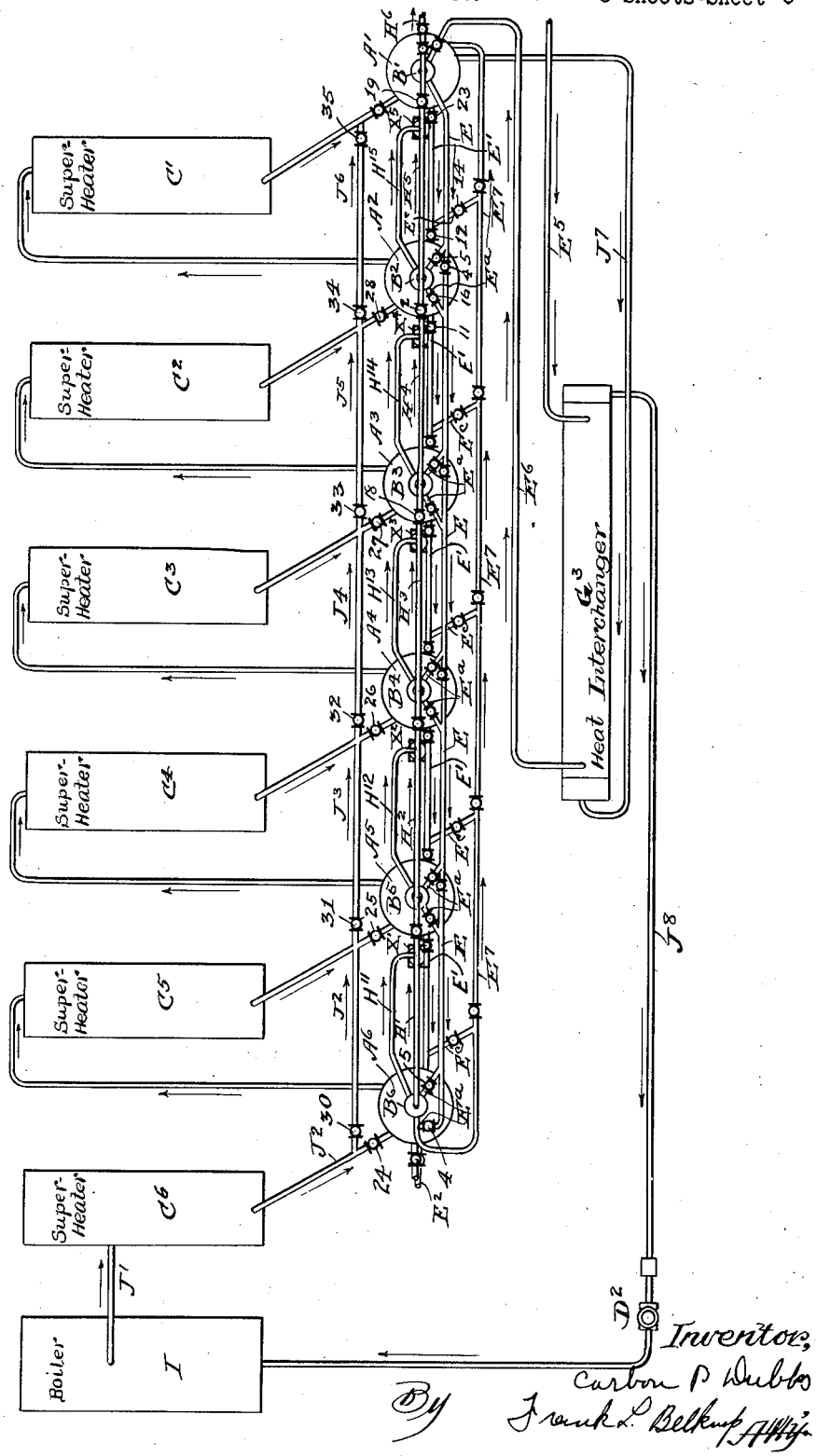

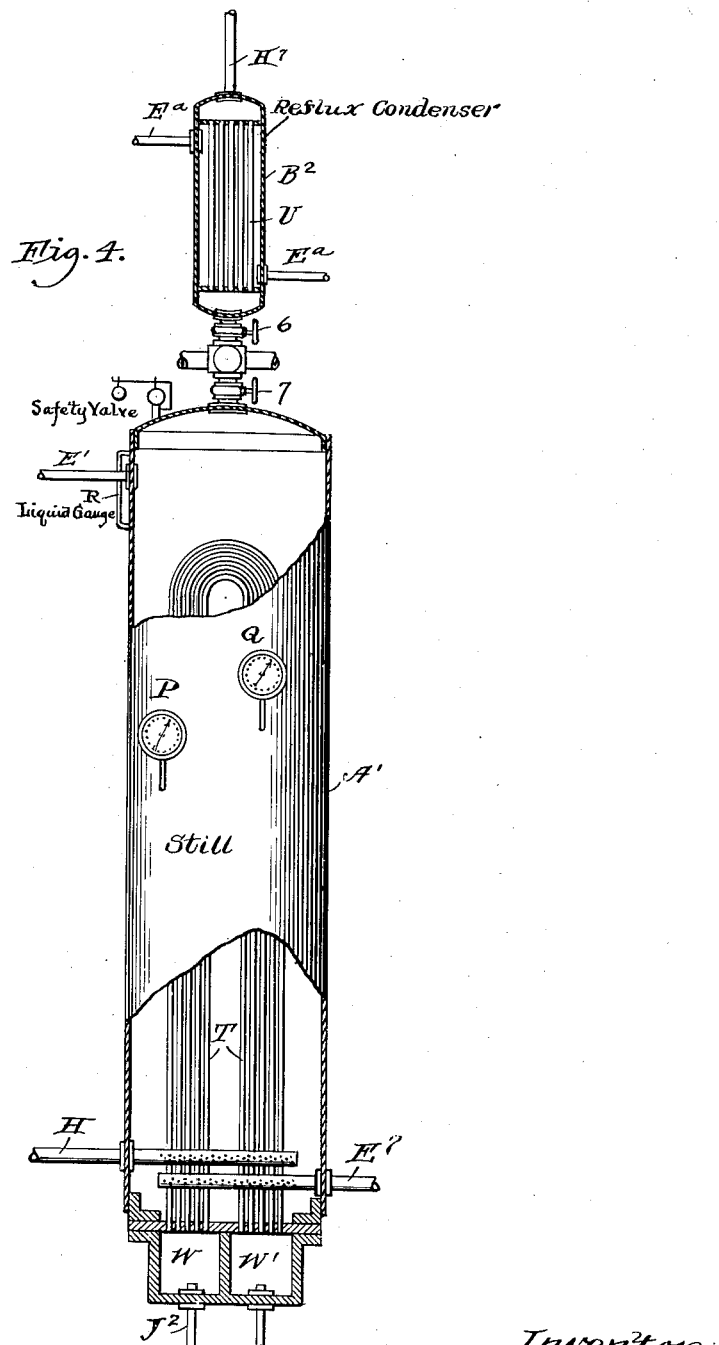

May 3, 1927.
C. P. DUBBS
1,627,159
METHOD FOR TREATING PETROLEUM AND OTHER HYDROCARBONS
Original Filed Nov. 30, 1917     5 Sheets-Sheet 5
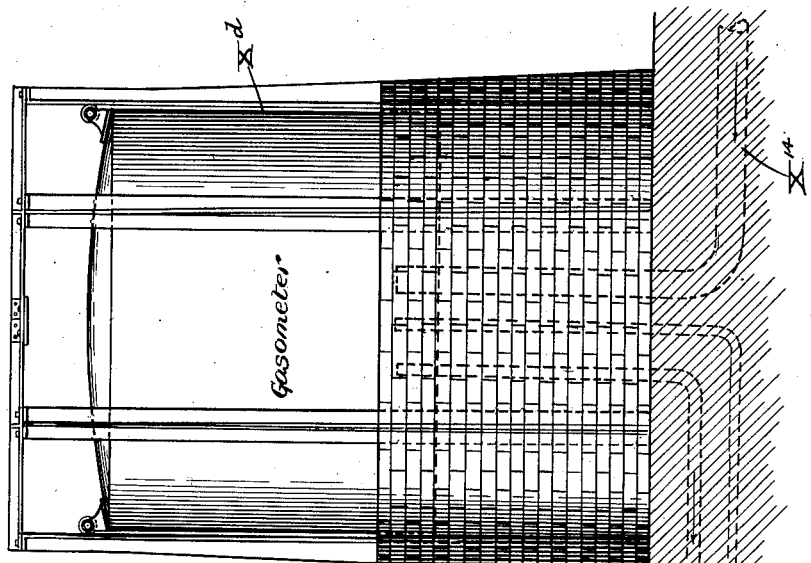
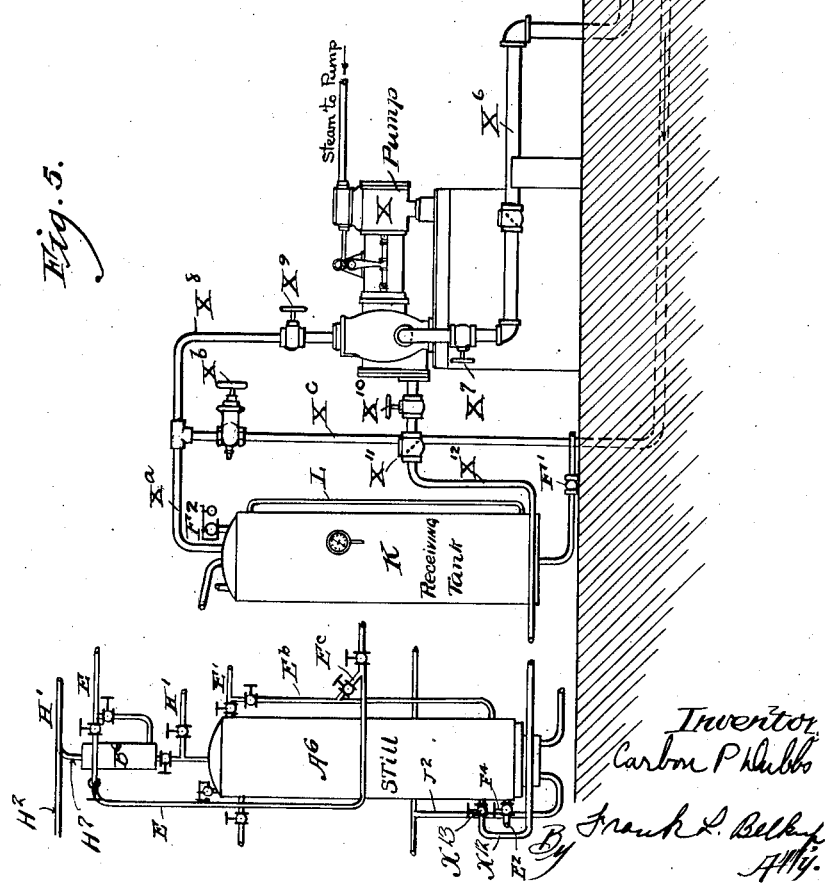

Patented May 3, 1927.

1,627,159

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

METHOD FOR TREATING PETROLEUM AND OTHER HYDROCARBONS.

Application filed November 30, 1917, Serial No. 204,526. Renewed July 16, 1923.

This invention relates to a method for treating petroleum and other hydro-carbons to produce hydro-carbon products having lower boiling points than those treated.

The invention contemplates a method whereby crude petroleum, petroleum distillates, petroleum residuum, or other like material can be placed in the apparatus and a gasolene like product produced. Other objects of the invention are: to provide a process in which the oil being treated is fractionally distilled and subjected to a cracking, breaking up, and polymerization process to convert heavier hydro-carbons or like substances into lighter, and then such changed or converted oil fractionally distilled as one uninterrupted process, and during such process, passing the vapors and gases generated back through the liquid body and incidentally thereby reducing the amount of uncondensable gases and unsaturated hydro-carbons; to provide a method whereby more or less of the hydro-carbon treated can be converted into the product desired; to provide a method wherein the heat units are utilized with the greatest efficiency; to provide a method in which a series of stills and chambers are employed and in which the hydro-carbons treated are subjected to progressively increasing temperatures; to provide a method in which the vapor and gases are subjected to progressively decreasing temperatures, the vapor and gases being preferably allowed to percolate up through the various chambers and stills, advancing from those having the higher temperatures to those having the lower temperatures; to provide a method wherein the vapors, whether the condensable vapors or the uncondensable gases, and the liquid are caused to contact with each other in the zones of re-action; to provide a process and method of operating which is facilitated by the use of pumps; to provide a method whereby the condensable vapors are condensed from the uncondensable gases, separated and collected separately therefrom while the uncondensable gases are, by means of a compressor of standard make, forced back through the pools of oil; to provide a method wherein the uncondensable gases are separated from the condensate and collected separately and then forced back into the pools of hot oil; to provide a method wherein the gases from any source or combination of sources are forced into the pools of oil.

The invention also resides in such features of construction and such process or method features as will more fully be hereinafter described.

In the drawings:

Figure 1 and Fig. 1ª is a diagrammatic side elevation of an apparatus by which my method can be carried out.

Fig. 2 and Fig. 2ª is a top plan view of the construction shown in Fig. 1.

Fig. 3 is an enlarged side elevation, partly in section of one of the heat interchangers.

Fig. 4 is an enlarged side elevational view, partly in section, of one the stills.

Fig. 5 is a diagrammatic side elevation showing still $A^6$ broken away from the rest of the stills, the receiving tank, the gas compressor, and gasometer tank of standard make, and the connections thereto.

Fig. 6 is a detail showing the connections between E and the refluxes $B^1$ etc.

Describing in detail the method with reference to the particular apparatus shown in the drawings, $A^1$, $A^2$, $A^3$, $A^4$, $A^5$, and $A^6$, it being understood any number of stills may be used, designate the stills in which the petroleum or other hydro-carbons to be treated are subjected to the action of heat. $G^2$ designates a heat interchanger, by which more or less of the heat contained in the final vapors and gas distilled off are transmitted to the incoming supply of raw material.

In practice, the oil is pumped or fed through the line E so as to go through the heat interchanger $G^2$, and then out through line $E^5$ to the heat interchanger $G^3$. From the latter heat interchanger the oil passes through the line $E^6$ to a series of reflux condensers marked $B^1$, $B^2$, $B^3$, $B^4$, $B^5$, and $B^6$, by means of pipes E and then through line $E^7$ into the bottom of the still $A^1$, the flow of the incoming charge of raw material being shown by the arrows positioned adjacent the pipe, or any other combination of the apparatus may be used that will accomplish the desired results, for instance, the raw material may be pumped directly into the heat interchanger $G^3$ and from there go directly into the bottom of any of the stills.

The raw material in the still $A^1$ is heated to drive off the vapors, the temperature depending, to a considerable extent, upon what product is desired. The vapors and gases generated in the still $A^1$, pass up through the reflux condenser $B^1$, in which the heaviest vapors condense and return to the still while the uncondensed vapors and gases pass through the pressure regulating valve $F^3$ and through the line $H^6$ into heat interchanger $G^2$, and from there through the water condenser $G^1$, into receiving tank K, sufficient pressure being maintained on this tank to force the distillate to any desired point and also force the uncondensable gases through line $X^a$, through valve $X^b$, through line $X^c$ into the gasometer $X^d$, from which point the gases are carried to the suction side of the pump X through line $X^6$ and valve $X^7$, or these gases may be carried to the suction side of said pump X directly from the receiving tank K through line $X^a$ and $X^8$ through valve $X^9$. Such gases supplied to pump X are forced through valve $X^{10}$, check valve $X^{11}$, pipe $X^{12}$ and through valve $X^{13}$ into the bottom of the pool of oil contained in the retort $A^6$, preferably through a perforated pipe as shown in Fig. 4 marked H. $X^{14}$ is a pipe leading from any outside source for charging the gasometer $X^5$ with gases other than that obtained from the pools of oil.

The residuum remaining in still $A^1$ overflows through pipe $E^1$ and enters the bottom of still $A^2$, which still is maintained at a higher heat, and the vapors and gases which are generated at the higher heat in this still $A^2$, pass up through reflux condenser $B^2$, the heavier vapors being condensed and returned to the still $A^2$, while the lighter vapors and gases pass through vapor line $H^5$ and pump $X^5$ and discharge through pipe H into the bottom of the still $A^1$, along with any condensed vapors, and percolate up through the oil contained in still $A^1$. The function of the pumps shown at $X^1$, $X^2$, $X^3$, $X^4$ and $X^5$, being to force the vapors, along with any condensed portion of the vapors and uncondensable gases, down through pipe H and out through the perforations in this pipe, into the bottom of the stills and thus facilitate the operation; these pumps may be of the spiral or rotary type of standard design and be operated by belt or by any of the other well known standard methods. The pumps themselves do not necessarily create a pressure on the apparatus, but are primarily for overcoming the pressure exerted against the vapors in pipe H created by the height of the columns of liquid contained in the stills.

The residuum remaining in the still $A^2$ overflows through pipe $E^1$ into still $A^3$ at the bottom, still $A^3$ being maintained at a higher heat than the preceding still $A^2$. The vapors which are generated at the higher heat in still $A^3$, along with the gases, then pass up through reflux condenser $B^3$, the heavier vapors being condensed and return to the still $A^3$, while the lighter vapors and gases pass through the line $H^4$ and pump $X^4$ to the bottom of still $A^2$ and are discharged along with any condensed vapors, through pipe H in the same manner as described with the preceding still.

The residuum remaining in still $A^3$ overflows through pipe $E^1$ into still $A^4$, the heat in this still being higher than in the preceding still. The same cycle of operation is then carried out for each still of the series so that by the time the residuum reaches the last still of the series it will have been subjected to progressively increasing temperatures until the desired amount has been converted into product desired. The residuum remaining in still $A^6$ is drawn off continuously or intermittently through the valve $F^4$ through pipe $E^2$ or through valve shown on side of still near the top, such residuum being passed through heat interchangers similar to $G^2$ and thus preheating the incoming supply of raw material, such residuum is rerun through the apparatus, either with or without any previous treatment, or with or without being mixed with other material.

It will be noticed that the raw material in passing through the apparatus forms a pool in each still and is subjected in the various stills to a progressively increasing temperature while the vapors and gases given off have not only been made to percolate up through the liquid and caused to mix with the liquid in the zones of reaction, but also have been caused to travel in the reverse direction from the liquid so as to be subjected to progressively decreasing temperatures. This arrangement permits the vapors and gases to be subjected to comparatively high and low temperatures without excessive pressure, while the vapors in their final form, as they pass to the condenser, have been scrubbed through the liquid and their temperature greatly reduced so that as they pass from the still $A^1$ to the condenser, they are at relatively low temperature to that to which they have been subjected in the farthest still.

This novel method of treatment will tend to prevent any heavy vapors, or such vapors which have not been sufficiently treated from passing to the condenser since the stepdown in temperature, as the vapors and gases pass through the various stills toward the condenser, will tend to condense any heavy vapors and cause them to be carried back with the residuum and again subjected to the higher temperature. Another material advantage of this method of treatment lies in the fact that the vapors and gases are being stepped down in temperature by percolating through the liquid in the successive stills having lower temperatures, the heat units which are extracted in cooling the vapors and gases are transmitted to the liquid which is traveling in the reverse direction and is stepping up in temperature.

While any desired method of heating the still may be employed such as the usual furnace, or internal electric heat, I have in the drawings shown the stills as designed to be heated by steam. In detail, the steam heating arrangement comprises the boiler I, and a plurality of super-heaters $C^1$, $C^2$, $C^3$, $C^4$, $C^5$, and $C^6$. The purpose of these super-heaters is to permit the temperature in the various stills being independently regulated and maintained at the progressively higher temperature for the various stills. In operation, the steam is generated in the boiler I, and passes through the steam line $J^1$ in the superheater $C^6$ and from there passes through pipe $J^2$ to the heating coils T, which are located in each of the stills. The steam is discharged through the pipe $J^2$ into the inlet manifold header W and then passes through the coils T to the outlet manifold $W^1$, from which it passes to the super-heater $C^5$. Here the steam may be reheated to secure any predetermined temperature for the still $A^5$. Should the heat units given up by the vapors and gases percolating through any still be sufficient to maintain the desired temperature in that particular still, the steam can be by-passed entirely from such still or stills, or partially by-passed by means of partly or wholly closing valves 24, 25, 26, 27, 28 and 29, and partly or wholly opening valves 30, 31, 32, 33, 34 and 35. The purpose of the arrangement is to permit the independent regulation of the temperatures of any one or all of the stills, while utilizing to the highest degree, the heat units given up by the vapors and gases being cooled from heating the liquid in the various stills.

After the steam has been utilized for heating, the various stills, its heat units are further conserved by transferring them into the incoming raw material by means of one or more heat interchangers $G^3$. The operation of this heat interchanger $G^3$ is as follows:

Steam is admitted through the pipe $J^7$ into the inlet manifold header $W^3$ from which it passes through the pipes $Y^1$ to the outlet header $W^4$, from which it is returned through the pipe $J^8$ to the boiler I.

In addition to the heat interchanger $G^3$, I preferably employ the heat interchanger $G^2$, in which the heat units of the vapor and gases, as finally discharged from the still $A^1$, are transferred to the incoming raw material. If a further cooling of the resultant vapors is necessary, a water cooler, having a water inlet $Z^1$ and water outlet $Z^2$, is positioned around the portion of the pipe $H^6$, leading to the distillate and gas receiving tank K, from which the resultant product in both liquid and gaseous form are received and discharged to their respective storages.

The reflux condensers are also utilized as heat interchangers in that the oil coming from the pipe E is discharged into chamber surrounding the pipes U (Fig. 4) of the reflux condenser and then pass out through the pipe $E^7$ near the upper end. Thus the heat units extracted from the vapors are transferred to the incoming raw material. The apparatus, however, is preferably arranged so that any one or multiple of these reflux condensers can be used or by-passed. Also the vapor lines are so arranged that the vapors and gases can be by-passed from any one or any multiple of the reflux condensers or stills. Also for convenience, in repairing or for other purposes, the apparatus should preferably be so constructed that any of the stills, heaters or condensers can be by-passed without in any way affecting the operation of the rest of the apparatus, suitable valves being provided. Any number of stills, reflux condensers, condensers, heat interchangers, etc., can be employed.

In the normal operation of the process, all of the parts are used, that is, none of the reflux condensers and none of the stills are by-passed or cut out of the system. In this condition the valves are arranged as follows:

Valves 3, 5, 6, 7, 9, 11, 13, 16, 28, 20 and 23 are opened while valves 2, 4, 8, 10, 12, 14, 19, 21, 22 and 34 are closed. The body of oil being treated passes as follows: The oil enters reflux condenser $B^1$, passes around the vapor pipes U in same, then out and then through the succeeding reflux condensers, in like manner, and from last reflux condenser, the oil enters still $A^1$, through perforated pipe in bottom of still connected to pipe E, overflows through pipe $E^1$, to perforated pipe in still $A^2$ and so on through each succeeding still, and is drawn off from the last still through valve $F^4$. If it is desired that the oil do not pass through any reflux condenser, to prevent the oil getting too hot, as for example in reflux condenser $B^2$, valves 5 and 16 would be closed while valve 4 would be opened. If it is desired that the oil flowing from the one still to the next succeeding still enter the top instead of the bottom of the succeeding still, as for example enter the top of the still $A^2$, then valve 13 would be closed and valves 11 and 12 opened, and the oil would then flow into and out of top of still.

The vapors generated in the different stills normally are passed up through the reflux condensers and then forced down and into the bottom of the next still through perforated pipe H, excepting still marked $A^1$, the vapors from which are carried to condensers and then condensed and collected separately. Any of the reflux condensers may be by-passed, as for example, reflux condenser B², by closing valves 6, 3 and 20 and opening valves 7 and 21. The vapors then pass through line H¹⁵. Similarly the other refluxes can be by-passed and the lines H¹¹ to H¹⁴ used.

As will be noted the oil normally passes from the main line E to each of the refluxers B¹ to B⁵ through branch pipes Eᵃ, Eᵃ, in which are located the valves 5, 16 respectively. A corresponding branch pipe Eᵃ leads from the main line to the refluxer B⁶ and this refluxer may be by-passed from the circulating body of oil by closing the valve 5 and opening the valve 4. Normally the valve 4 is closed and the valve 5 is opened. Valve F¹³ acts the same as valve F³ when the vapors are not passed through reflux condenser B¹. At this time the valve H¹⁶ is opened.

From the above description it will be apparent that the raw material is first preheated by the heat units extraced in cooling the heated vapors and gases, second, that the material treated is progressively subjected to increasing temperatures while maintaining any desired pressure on the vapors generated, and that the resultant vapors are caused to travel in the reverse direction, that is, through progressively decreasing temperatures while caused to percolate up through the liquid so that the liquid, vapors and gases are present in the zones of reaction, and the vapors and gases progressively advanced toward the still or through a portion of the apparatus having a lower temperature. The temperature to which the oil is heated may vary during the process from a minimum of 200 degrees F. to 500 degrees F. and from a maximum of 500 degrees F. to 2000 degrees F. The pressure may vary from a minimum of 50 pounds to the square inch to a maximum of 1000 pounds to the square inch.

While I have shown and described a particular apparatus for carrying out my method, the latter is not limited to use with the particular apparatus shown and described. Also various changes in the details of construction, connections and operations of the apparatus can be made within the scope of my invention.

The following illustrative run may be given: Taking gas oil from the mid-continent field of say, 32° to 34° Baumé, and preheating the same by subjecting it to the heat of the respective dephlegmators, and subsequently charging it to the still A¹, from which it overflows to the successive stills and in each is subjected to a higher temperature. From each still will be drawn gaseous vapors and the same will be subjected to the dephlegmating action of the reflux condenser and from the final stage, a quantity of this uncondensable gas will make its way back to the pools. The temperature of the first still, using gas oil of this character, would be approximately 400° F. in each successive still the temperature would be raised approximately 50° to 100°. The final yield would be from 40% to 50% of low boiling point distillate and from this distillate may be subsequently distilled a product having a boiling point of approximately 400° F.

I claim as my invention:

1. A process for converting petroleum into lower boiling point hydro-carbons consisting in collecting the oil in a plurality of pools and while under pressure subjecting the pools of oil to progressively increasing temperatures, continuously supplying the oil to the pool of lowest temperature and conducting the overflow from each pool to the pool of next higher temperature, condensing and collecting vapors arising from the pool of lowest temperature and removing vapors from each pool, other than that of lowest temperature, passing them through a reflux condenser associated with the pool, returning the condensed products back to the pool and forcing the remaining vapors back through the pool of next lower temperature, collecting the uncondensible gases formed in the process and passing them through the oil.

2. A process for converting petroleum into lower boiling point hydrocarbons consisting in collecting the oil in a plurality of pools and while under pressure, subjecting the pools of oil to progressively increasing temperatures, continuously supplying the oil to the pool of lowest temperature and conducting the overflow from each pool to the pool of next higher temperature, in introducing the vapors to a dephlegmator, returning the condensed product to the pool and forcing certain of the remaining vapors from certain stills back through the pool of next lower temperature, collecting the uncondensable gases formed in the process and injecting the same into the pool of highest temperature.

CARBON P. DUBBS.